Aug. 9, 1932.   G. H. McINTYRE ET AL   1,870,636
APPARATUS FOR MAKING GLASS AND VITREOUS ENAMELS
Filed Aug. 5, 1930   6 Sheets-Sheet 1

FIG 1

Aug. 9, 1932.  G. H. McINTYRE ET AL  1,870,636
APPARATUS FOR MAKING GLASS AND VITREOUS ENAMELS
Filed Aug. 5, 1930   6 Sheets-Sheet 3

INVENTOR.
Glenn H. McIntyre and
Robert W. Stuart
BY
ATTORNEYS.

Fig. 4

Aug. 9, 1932.  G. H. McINTYRE ET AL  1,870,636
APPARATUS FOR MAKING GLASS AND VITREOUS ENAMELS
Filed Aug. 5, 1930  6 Sheets-Sheet 5

INVENTOR.
Glenn H. McIntyre and
Robert W. Stuart
BY
Fay Oberlin & Fay
ATTORNEYS.

Patented Aug. 9, 1932

1,870,636

UNITED STATES PATENT OFFICE

GLENN H. McINTYRE AND ROBERT W. STUART, OF CLEVELAND, OHIO, ASSIGNORS TO THE FERRO ENAMEL CORPORATION, OF CLEVELAND, OHIO, A CORPORATION OF OHIO

APPARATUS FOR MAKING GLASS AND VITREOUS ENAMELS

Application filed August 5, 1930. Serial No. 473,210.

This invention relating, as indicated, to method of and apparatus for making glass or vitreous enamels, has specific reference to method and apparatus for continuously melting the materials employed for making such glass or enamels. As is well known to those familiar with the art of glass or enamel manufacture, vitreous enamels are vitreous glass made opaque by the addition of opacifying material to the mix for a clear glass. Considerable difficulty is experienced in the manufacture of opaque enamels in order to obtain a consistent distribution of the opacifying ingredients in the resulting enamel after the materials, from which such enamels are made, have been melted in the melting furnaces or kilns. The method or methods heretofore employed for melting the materials used in the manufacture of vitreous enamels has been to dump a considerable quantity of such materials on to a sloping floor of a frit kiln and to then melt down such mass and to permit the enamel, as it melts, to run into a fining chamber or to immediately discharge the same into a water bath.

Among the ingredients employed in the manufacture of vitreous enamels the following usually occur: feldspar, quartz, borax, soda ash, zinc oxide, sodium nitrate, bone ash, fluorspar, cryolite, antimony oxide, and litharge. As is very apparent when a pile of material containing the above ingredients is subjected to a high temperature, some of such materials, namely borax, soda ash, sodium nitrate, and others, will flux out at low temperatures before the other ingredients are melted. Consequently, some of the materials will separate and flow away from the mass before others, resulting in inconsistency in the quality of the frit produced by this process and also a marked streaking of such frit due to uneven distribution of the opacifying materials.

It is among the objects of our invention to provide a method and apparatus for melting the materials from which vitreous enamels are formed by progressively depositing a relatively thin layer of such materials on the floor or bed of the melting furnace, so that all of the materials will be melted more quickly, so as to eliminate all possibilities of separation. By distributing the material to be melted in a thin layer over the bed of the melting chamber, other advantages will be obtained which will appear as the description proceeds.

A further disadvantage of methods for melting vitreous enamels operating on the batch theory, is that, by the injection of a relatively large quantity of material to the furnace, the temperature of the melting chamber is appreciably reduced, which reduction in temperature has a harmful influence on the frit produced by such process. Any process of manufacture which is continuous in operation rather than intermittent has long been recognized as the most advantageous method to employ, so that the method comprising our invention accomplishes other objects, believed to be so well known that a reiteration thereof at this point is unnecessary. To the accomplishment of the foregoing and related ends, said invention, then, consists of the means hereinafter fully described and particularly pointed out in the claims.

The annexed drawings and the following description set forth in detail certain means and one mode of carrying out the invention, such disclosed means and mode illustrating, however, but one of various ways in which the principle of the invention may be used.

Figure 1:
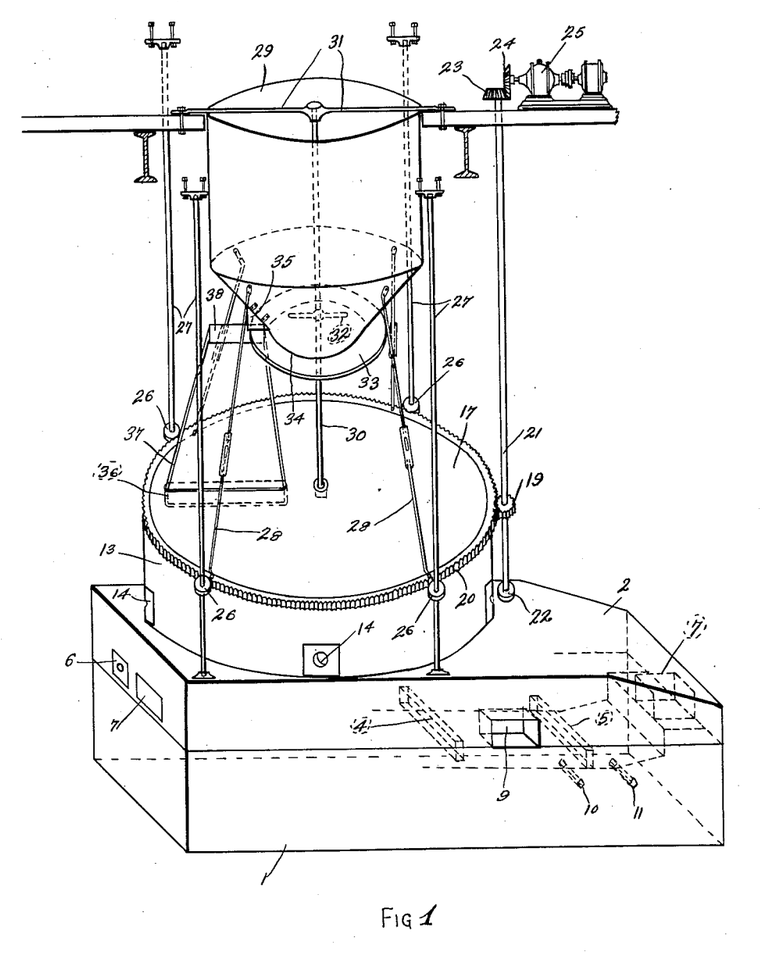
Fig. 1 is a perspective view of one form of the apparatus comprising our invention.

Referring more specifically to the drawings and more especially to Figs. 1, 2, and 3 inclusive and like figures and other figures in which like ordinals are employed to designate like parts, the frit kiln, constructed in accordance with the principles of our invention, consists of a bed 1 which has supported in overlying relation with respect thereto a cover 2 which serves as a means of support for the melting chamber and its associated feed mechanism hereinafter more fully described. In the space between the bed 1 and the cover 2 is a fining chamber or soaking pit 3, which may have baffles, such as 4 and 5, extending transversely thereof for the purposes hereinafter more fully explained. Apertures, such as 6, 7, 8, and 9 may be formed in the walls of the fining chamber to serve as means for receiving the burners employed to heat such chamber or to serve as means of inspection for the material contained therein. Likewise tap holes 10 and 11 may be provided in the wall of the fining chamber, preferably on opposite sides of the baffle 5, such holes being employed for the purpose of withdrawing the contents of such fining chamber.

The melting chamber for the raw materials from which the vitreous enamel is made consists of a concave bed 12, which is surrounded by an annular wall 13, which has a plurality of apertures 14 formed therein, adapted to receive the burners for heating such melting chamber. The bed 12 of the melting chamber has a discharge aperture formed centrally thereon leading downward to the fining chamber, which aperture may be provided with peripheral upwardly extending baffles 15, which may be provided with apertures 16 formed therein below their upper edges. Rotatably mounted on annular wall 13 is a cover 17, which may be supported on circumferentially spaced walls 18, so as to permit a free rotation of the cover 17 relative to the wall 13. Rotation of the cover 17 is obtained by means of a driving pinion 19 meshing with an annular gear 20 secured to the periphery of the cover 17. The pinion 19 may be keyed to a shaft 21, which is terminally supported in a bearing 22 on the cover 2 of the fining chamber and such shaft may have a pinion 23 secured in mesh with a pinion 24 secured to the drive shaft of a suitable prime mover, such as an electric motor 25. Proper alignment between the cover 17 and the wall 13, specifically the supporting walls 18 mounted on such wall, may be insured by a plurality of rollers 26, which are attached to engage with the periphery of the cover 17, and be supported by suitable rods such as 27.

Mounted on the cover 17 by means of supporting brackets 28 and consequently rotatable with such cover is a hopper 29, adapted to receive the raw material to be fed to the melting chamber. Positioned coaxially with the hopper 29 is a stationary rod 30, supported at one end of the cover 17 and at the other by oppositely extending brackets 31 secured to a suitable form of support. The rod 30 may have agitators 32 secured thereto, which when the hopper 29 rotates will prevent the material contained in such hopper from becoming compacted which would interfere with the feeding operation. The rod 30 has likewise secured thereto a disc 33, which is adjacent the discharge terminal 34 of the conical bottom of the hopper 29. The conical bottom of the hopper 29 may have a plow 35 secured thereto at one point, which will scrape off from the plate 33 the material which has been fed thereon by the hopper 29.

The cover 17 has a radially extending aperture formed therein, which has mounted thereover a material conveying chute 37, which is opened at its upper end 38 opposite the plow 35, so as to receive the material discharge from the disc 33 by such plow.

Figure 2:
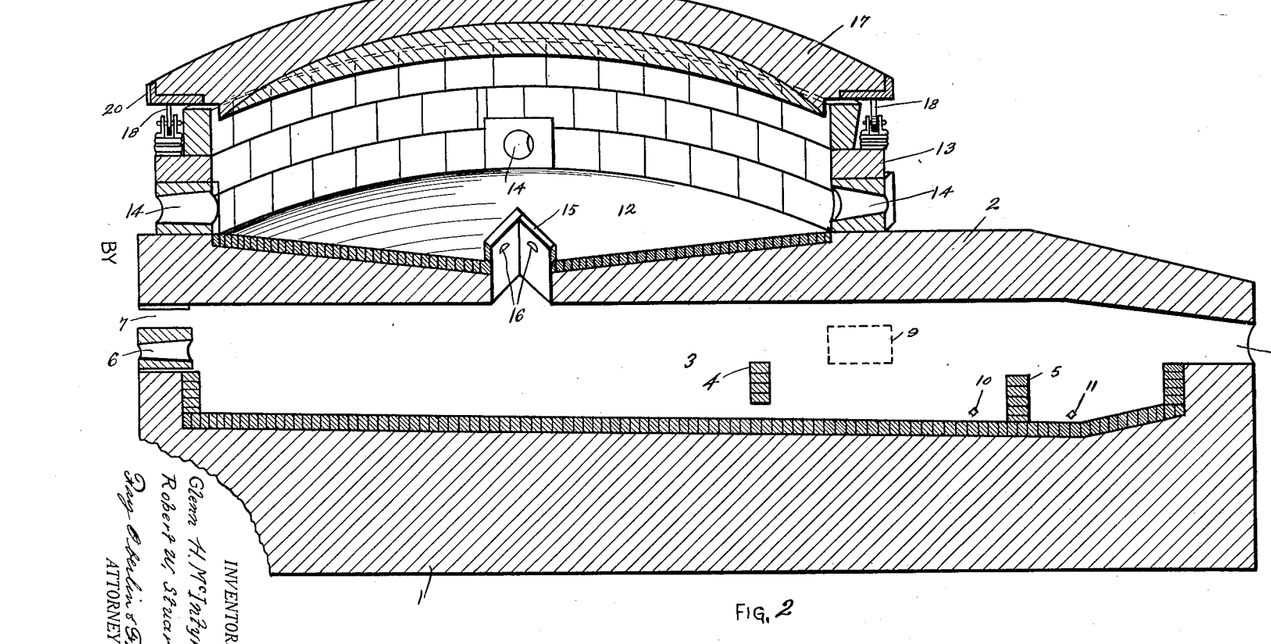
Fig. 2 is a transverse sectional view of a portion of the apparatus illustrated in Fig. 1.
Figure 3:
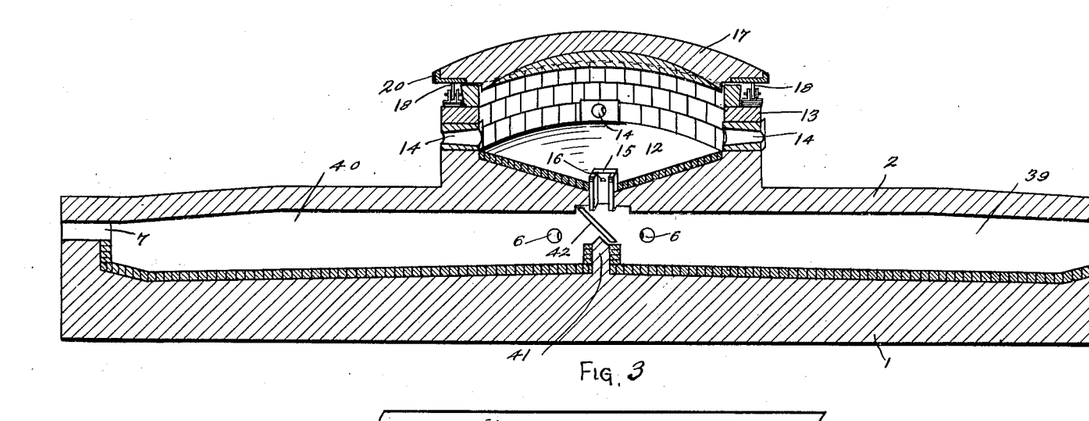
Fig. 3 is a transverse sectional view of an alternative form of construction of the apparatus disclosed in Fig. 1.

Instead of employing the form of fining chamber construction beneath the melting chamber, as above described and as most clearly illustrated in Fig. 2, we may prefer to employ a pair of adjacent fining chambers 39 and 40, as illustrated in Fig. 3, which are separated by a transversely extending wall 41, positioned directly beneath the discharge aperture formed centrally in the bottom of the melting chamber. By having the upper surface of the transversely extending wall 41 oppositely tapered, as most clearly illustrated in this figure and by employing a reversible flow directing member 42, the enamel discharge from the aperture in the bed of the melting chamber may be selectively caused to flow into either of the fining chambers 39 or 40.

Figure 4:
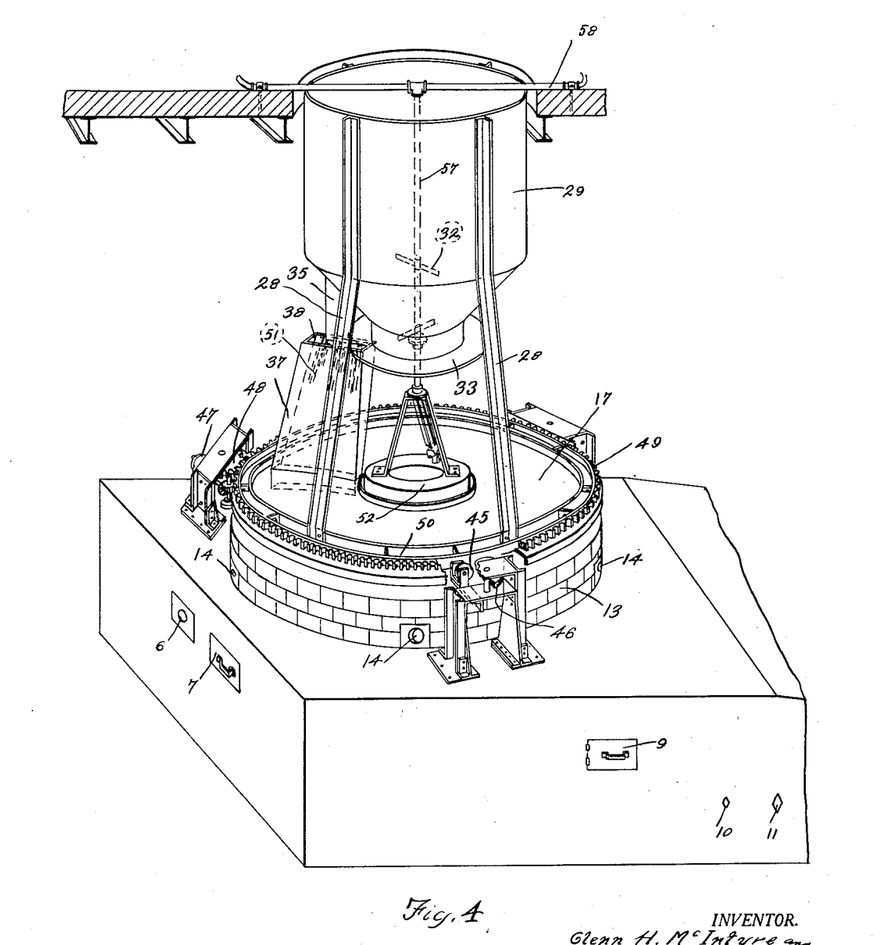
Fig. 4 is a perspective view showing the preferred form of construction of the apparatus, as disclosed in Fig. 1.

The preferred embodiment of the construction comprising our invention is illustrated in Figs. 4 to 8 inclusive, in which the modifications of the structure, described in connection with the previous figures, reside in the provision of the separately mounted guide and supporting wheels 45 and 46, which respectively vertically support the cover 17 and maintain the same in axial alignment with the annular wall 13 surrounding the melting chamber. A more compact drive is illustrated in Fig. 4 including a motor 47, which, through a train of enclosed gears 48 drives the cover 17 through the medium of an annular gear 49, which may be provided with a trough 50 for a cooling medium for such gear. The other modifications of the feed hopper and its associated mechanism are believed to be immaterial, so that reference numerals, similar to those employed in connection with previous figures will be again employed to denote like parts. As indicated in Fig. 4, the material conveying chute 37 may be provided with a plurality of vanes or ridges 51 on the interior thereof, so as to effect a proper distribution of the material passing therethrough.

Figure 5:
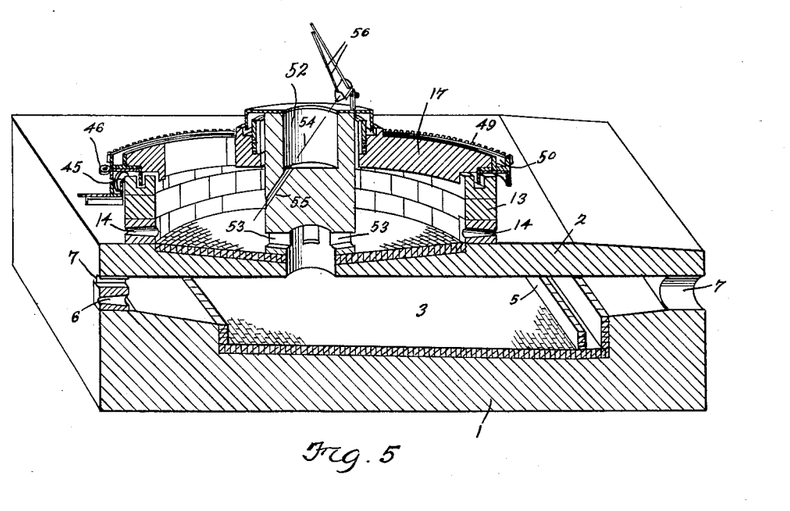
Fig. 5 is a fragmentary half sectional perspective view of the apparatus illustrated in Fig. 4.

The cover of the melting chamber in the preferred form of construction instead of being continuous, as disclosed in the previous figures, is formed with a central aperture upwardly through which may project the pillar 52, which is supported by certain circumferentially spaced legs 53 around the discharge aperture formed centrally in the bottom of the melting chamber, the space between such legs affording means for egress of the melted enamel. By having built-up portions above the floor or bed of the melting chamber between the legs 53, a pool of the melted material may be formed for the purposes hereinafter more fully explained. By having the pillar 52 extend upwardly through the cover of the melting chamber means is provided for the introduction of a thermo-couple 54, which may extend through an aperture 55 formed so as to make possible the measurement of the temperature within the melting chamber. The leads 56 of the thermo-couple 54 may pass upwardly through the hollow member 57 and thence out through the hollow supporting brackets 58 to the instrument measuring the temperature. It will be noted in this preferred form of construction that annular axially extending flanges are provided on the outer and inner peripheries of the cover of the melting chamber, which flanges run in annular sand seals so that no heat is permitted to escape from the melting chamber by air currents which would otherwise flow through the means by which the cover is rotatably supported.

Figures 7, 8:
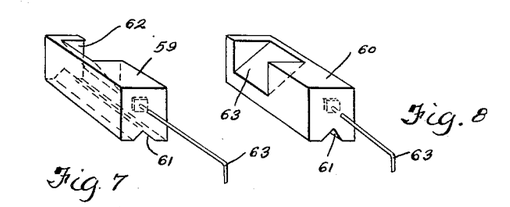
Figs. 7 and 8 are respectively perspective views of elements of the apparatus employed in the form illustrated in Fig. 4.

Instead of providing a tiltable or reversible flow directing element such as 42, illustrat d in Fig. 3, for the purpose of directing the flow of melted enamel into the flow of either of the fining chambers, we may prefer to employ flow directing members such as are illustrated in Figs. 7 and 8. These flow directing members comprise substantially rectangular blocks 59 and 60 formed of suitable refractory material and each provided with longitudinally extending grooves 61 formed on the bottom thereof, adapted to be slidably engaged by the oppositely tapered upper edge of the transversely extending wall 41. The members 59 and 60 are also provided with oppositely directed channels 62 and 63, which, when such members are positioned on the wall 41, will cause the melted enamel to flow to the selecting fining chamber. By providing each of the members 59 and 60 with a handle such as 63, such members may be introduced to their operating position or withdrawn through suitable apertures formed in the side or sides of the fining chambers.

Figure 9:
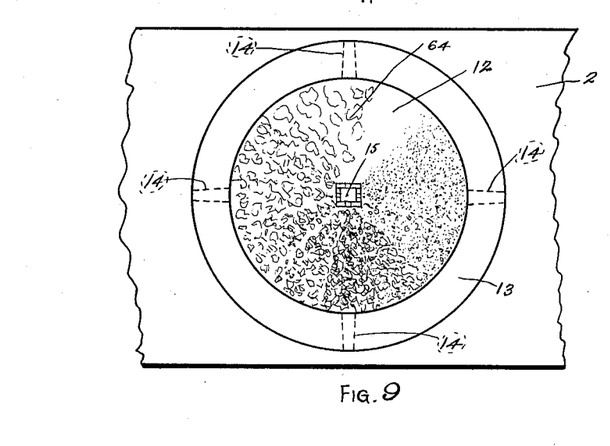
Fig. 9 is a fragmentary plan view showing the bed of the melting chamber with diagrammatic illustrations of the material thereon.

The operation of the aperture comprising our invention may be briefly described as follows: With the feed hopper 29 of sufficient height, the material to be melted may be introduced to such hopper from the floor beneath which the melting furnace is positioned, so that the feeding of the material may be most readily accomplished. With the top 17 of the melting chamber rotating at a uniform speed, which speed may be controlled by varying the speed of the drive motor, the disc 33 will not be rotated so that the material from the reduced end of the feed hopper will flow in the form of a cone on such disc. By regulating the distance between the disc and the discharging end of the hopper, the rate of feed of the material can be accurately controlled. As the hopper rotates, it carries with it the shovel 35, which scrapes off from the disc the material which has passed thereon from the feeding hopper, discharging the same into the material delivery chute 37, which will progressively spread a thin layer of the raw material on the bed of the melting chamber. The distribution of the material on the bed of the melting chamber is diagrammatically illustrated in Fig. 9 in which the material at 64 is that which has just been deposited on the bed by the clockwise rotation of the material chute 37. The speed of rotation of the cover of the melting chamber may be regulated so that the floor of such chamber immediately in advance of the material delivery chute has been melted free of the material deposited thereon by the immediately previous rotation of such chute. In this manner only a relatively thin layer of the material is fed to the bed of the melting chamber, so that such material may be quickly melted and discharged therefrom without separation of the ingredients, such as resulted when the old batch type of feed was employed. As the melted material flows down the concave or sloping sides of the bottom of the melting chamber, some unmelted material may be carried along therewith. In order to insure that no unmelted material will reach the fining chamber, the peripheral wall 15 around the discharge opening of such melting chamber will trap such unmelted portions and restrain the same sufficiently so that only melted material will pass through the aperture 16 or between the legs of 53 and be discharged into the fining chamber underneath the melting chamber.

It will be understood that by properly controlling the rate of feed of the raw material to the melting chamber so that under the proper melting temperatures for the enamel being made, the raw material will all be melted by the time it has run off from the sloping bottom of the melting chamber, the baffle around the discharge opening may be omitted, and the melted enamel permitted to flow directly into the fining chamber under the melting chamber.

When fining chambers, such as are illustrated in Figs. 2 and 5 are employed the melted enamel will pass downwardly into such chamber and if a continuous discharge of the melted enamel is desired, one of the discharge apertures, specifically 11, may be left open at all times, so that the pool of enamel restrained by the transversely extending baffle 5 will effect a sufficient fining of the enamel before the same spills over such baffle and is discharged through such aperture 11. The baffle 4, which extends above the normal level of the enamel to the left of the baffle 5, forces in unmelted material into the body of the material in the pool, so that a proper agitation and melting of the enamel results before the same is discharged from the fining chamber.

If it should be necessary to maintain the melted enamel in a pool under proper temperatures in the fining chamber therein, in order to eliminate all of the seeds therein, both apertures 10 and 11 may be closed and the fining chamber permitted to fill and after having been so filled, permitted to soak for a predetermined time in order to remove any seeds which may be present.

Figure 6:
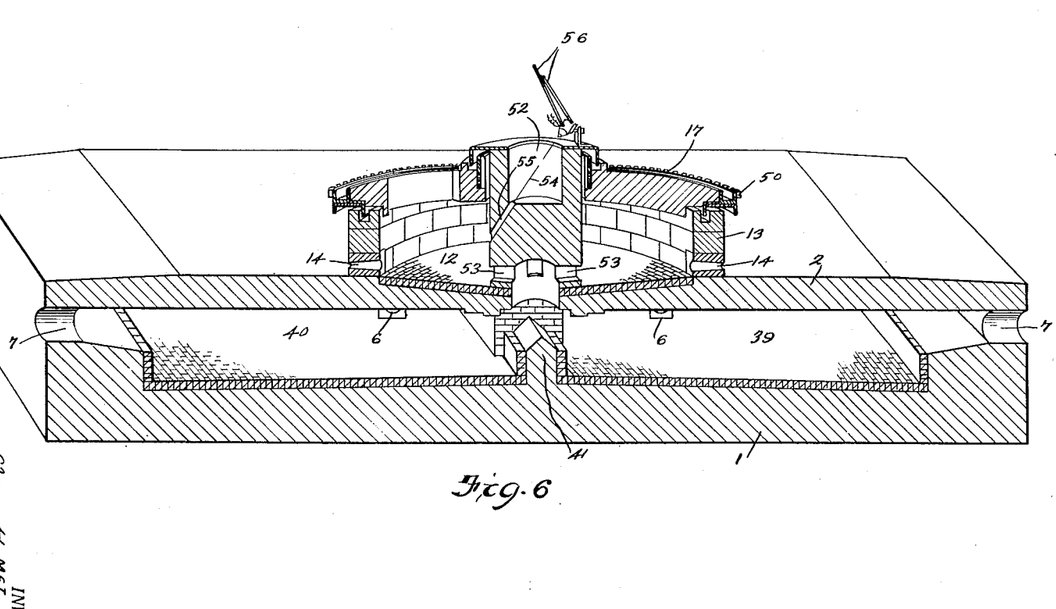
Fig. 6 is a fragmentary half sectional perspective view of a modified form of construction of the apparatus illustrated in Fig. 4.

If, however, the particular class of material from which the enamel is to be made requires that the same soak for a considerable period of time in a pool under properly controlled temperatures, we may prefer to employ fining chambers constructed as illustrated in Figs. 3 and 6.

In the form of construction the enamel flow directing means, such as 42 and 59 or 60, will be positioned in proper relation to the discharge aperture in the bed of the melting chamber, so as to direct the melted enamel into the selected fining chamber 39 or 40. The melting chamber will be operated continuously until the first selected fining chamber has been filled with melted enamel and then without interruption of the continuance of operation of the melting chamber by a proper adjustment or replacement of the enamel flow means on the wall 41 the melted enamel discharged from the melting chamber may be caused to flow to the other of such fining chambers. The melted enamel in the first named fining chamber may then be permitted to soak under properly controlled temperatures until the second of such fining chambers has been almost completely filled, at which time the first named fining chamber may be tapped and the contents withdrawn preparatory to repeat the above cycle of operation. Regardless of the particular form of the fining chamber construction employed in connection with the above described melting chamber, it will be noted that the feed to the melting chamber may be carried on continuously and without interruption.

When apparatus for forming vitreous enamels is constructed in accordance with the above described principles, it will be noted that such apparatus can be operated at a much lower heat consumption for given quantities of enamels to be melted due to the fact that the bottom of the melting chamber on which the enamel is deposited is directly over the fining chamber into which the melted enamel is introduced and permitted to soak. By having the bottom of the melting chamber positioned over the fining chamber so that such melting bottom is heated from both sides, the raw materials when distributed in a relatively thin layer on such bottom will be melted simultaneously throughout the entire thickness of such layer in contradistinction to the melting of only the upper surface of such layer which occurs when the material is placed on a melting bottom and heated only on its upper surface. This heating of the bottom of the melting chamber effects a simultaneous heating and melting of all of the raw material in the layer deposited thereon, so that a separation of the several elements of such material is further reduced.

The positioning of the melting chamber immediately above the fining chamber or chambers has a further advantage in that the waste heat from the melting chamber is drawn downwardly through the discharge aperture for the melted enamel formed centrally in the bottom of such chamber, so that such waste heat may be utilized as one source of heat for the soaking or fining chambers. This also appreciably reduces the heat consumption of the apparatus comprising our invention as compared to the amount of heat required to melt again quantities of material in apparatus as heretofore constructed. A further disadvantage of enamel melting apparatus, as heretofore constructed, has been that when the material which is usually in finely ground form is deposited on the floor of the melting chamber of such apparatus, the draft up the flue in communication with the melting chamber has usually carried with it a considerable quantity of the finely ground raw batch ingredients which either passed out of such stack into the open air, or were melted and deposited on the walls of such stack, seriously curtailing the efficiency thereof. In the apparatus comprising our invention, the draft discharge from the melting chamber passes downwardly through the aperture provided centrally in the bottom of such chamber and thence through the heated fining chamber out through an aperture, such as 7 on the right in Fig. 5, which is suitably connected to the stack. This path, through which the waste heat and the draft from the melting chamber must flow in order to pass to the stack, causes all of the finely divided raw batch ingredients suspended in the air incidental to the charging or feeding of such material to be melted and dropped into the melting chamber or the fining chamber before the waste gases eventually pass into the stack. This feature of our construction effects a considerable saving due to the conservation of a considerable portion of material which has heretofore been permitted to pass out into the flue or stack of the apparatus and our apparatus has the additional advantage in that the stack employed in connection therewith is not foul and made inefficient by the collection on the walls thereof of a quantity of melted enamel which has passed to such stack from the melting chamber.

By employing a plurality of fining chambers such as are illustrated in Figs. 3 and 6, we are enabled to accurately follow, keep separate and maintain accurate records on individual mixes or batches in which such vitreous enamels are usually made. The material being fed to the melting chamber in a relatively thin stream deposited on the floor of such chamber, such material will quickly melt and flow into the selected fining chamber into which the flow thereof is directed. In this manner the temperature control charts and other data which are in a great many instances necessary parts of the record of each batch of enamel can be accurately obtained and a history of the particular mix or batch kept so that the exact conditions of manufacture for each sample of the finished product is always available. It will be noted by those familiar with the art of vitreous enamel manufacture that numerous other desirable advantages are attained by the method and apparatus comprising our invention, which advantages are believed so well known that a reiteration at this point is believed unnecessary.

It will be noted that throughout the above description the employment of the method and apparatus of this invention has been applied to the manufacture of vitreous enamels, but it is to be understood that such method and apparatus can likewise be employed in the manufacture of ordinary glass and also opaque glass with the same advantages attained.

Other modes of applying the principles of our invention may be employed instead of the one explained, change being made as regards the means and the steps herein disclosed, provided those stated by any of the following claims or their equivalent be employed.

We therefore particularly point out and distinctly claim as our invention:

1. In apparatus for making vitreous materials, the combination with a melting chamber having a coniform bottom for receiving the raw materials to be melted, a centrally located discharge aperture in said bottom, and means for progressively depositing such material on such bottom.

2. In apparatus for making vitreous enamels, the combination with a melting chamber, a coniform bottom for such chamber adapted to receive the material to be melted, a centrally located discharge aperture in said bottom, and means for depositing uniform layers of raw material on successively adjacent portions of such bottom.

3. In apparatus for making vitreous enamels, the combination of a melting chamber, a conical bottom for such chamber, a discharge aperture centrally in said bottom, and means for depositing uniform layers of material on the sloping portions of said bottom.

4. In apparatus for making vitreous enamels, the combination of a melting chamber, a coniform bottom for said chamber sloping to a central area, a discharge aperture in said area, a peripheral baffle around said aperture for collecting the melted enamel in a pool; and means for depositing uniform layers of material on the sloping portions of said bottom.

5. In apparatus for making vitreous enamels, the combination of a melting chamber a bottom for said chamber sloping to a central area, a discharge aperture in said area, a rotatable cover for said chamber, and means associated with said cover for spreading layers of raw material on said bottom.

6. In apparatus for making viterous enamels, the combination of a melting chamber, a bottom for said chamber sloping to a central area, a discharge aperture in said area, a rotatable cover for said chamber, and means associated with said cover for progressively spreading a layer of raw material on said bottom.

7. In apparatus for making vitreous enamels, the combination of a melting chamber, a bottom for said chamber sloping to a central area, a discharge aperture in said area, a rotatable cover for said chamber, a radially extending aperture in said cover, and means for feeding material through said radially extending aperture to progressively spread a layer of such material on said bottom.

8. In apparatus for making vitreous enamels, the combination of a melting chamber, a bottom for said chamber sloping to a central area, a discharge aperture in said area, a peripheral baffle around said aperture for collecting the melted enamel in a pool, a rotatable cover for said chamber, and means associated with said cover for spreading layers of raw material on said bottom.

9. In apparatus for making vitreous enamels, the combination of a melting chamber, a bottom for said chamber sloping to a central area, a discharge aperture in said area, a peripheral baffle around said aperture for collecting the melted enamel in a pool, a rotatable cover for said chamber, and means associated with said cover for progressively spreading a layer of raw material on said bottom.

10. In apparatus for making vitreous enamels, the combination of a melting chamber, a bottom for said chamber sloping to a central area, a discharge aperture in said area, a peripheral baffle around said aperture for collecting the melted enamel in a pool, a rotatable cover for said chamber, a radially extending aperture in said cover, and means for feeding material through said radially extending aperture to progressively spread a layer of such material on said bottom.

11. In apparatus for making vitreous enamels, the combination of a melting chamber, a bottom for said chamber for receiving the materials to be melted, a pier arranged coaxially within said melting chamber, an annular rotatable cover for such chamber, and means associated with said cover for feeding the raw materials to said melting chamber.

12. In apparatus for making vitreous enamels, the combination of a melting chamber, a bottom for said chamber for receiving the materials to be melted, a pier arranged coaxially within said melting chamber, an annular rotatable cover for such chamber extending radially from such pier to the annular wall of said melting chamber, means associated with said pier extending into said chamber for measuring the temperature thereof, and means associated with said cover for feeding the raw materials to said melting chamber.

Signed by us this 31st day of July, 1930.

GLENN H. McINTYRE.
ROBERT W. STUART.